July 10, 1962   D. J. WYROUGH   3,043,411
SYSTEM FOR HANDLING FREIGHT ARTICLES
Filed Oct. 9, 1959
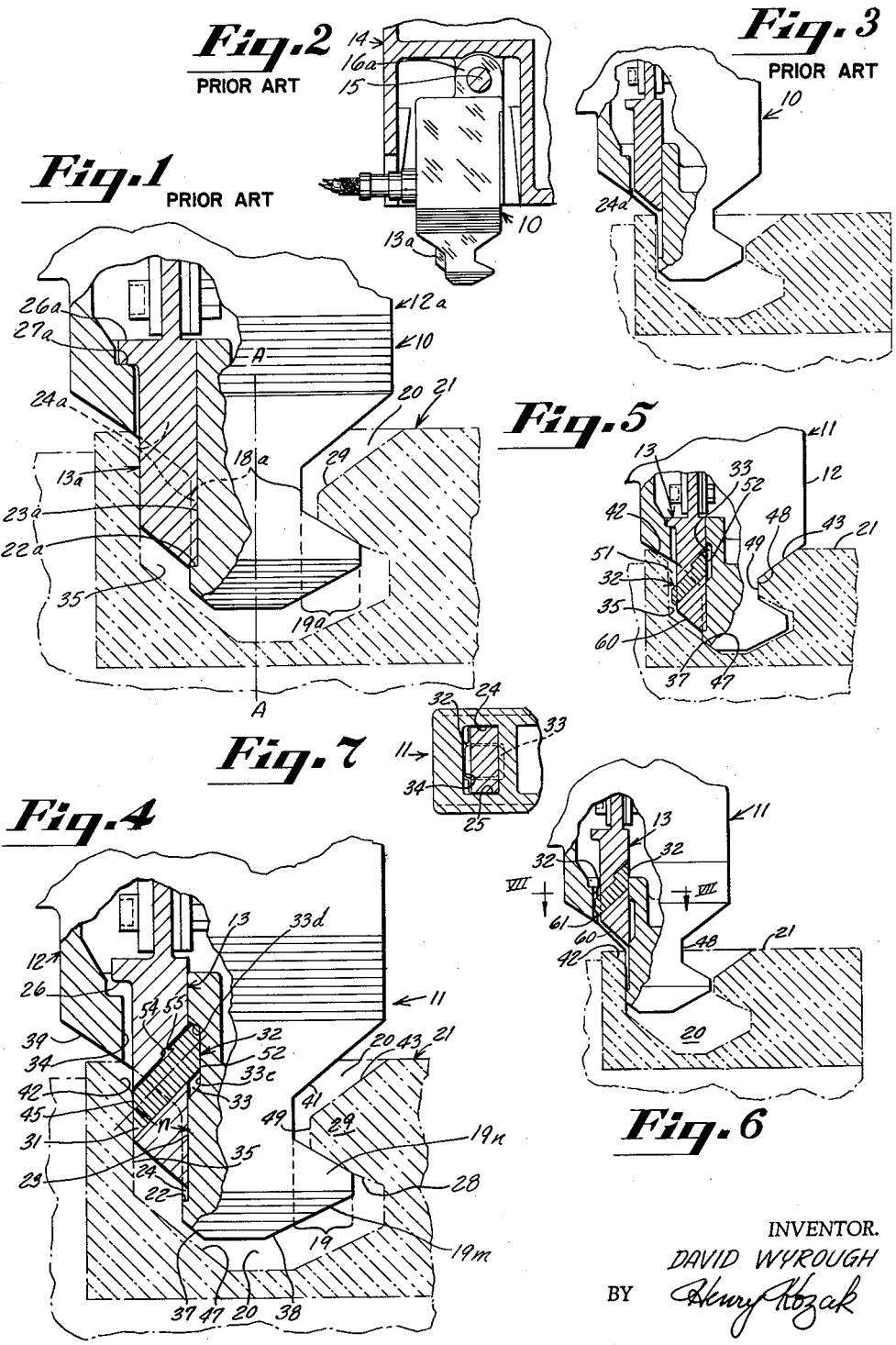
INVENTOR.
DAVID WYROUGH
BY Henry Kozak
ATTORNEY

United States Patent Office 3,043,411
Patented July 10, 1962

3,043,411
SYSTEM FOR HANDLING FREIGHT ARTICLES
David J. Wyrough, Maple Heights, Ohio, assignor to National Castings Company, a corporation of Ohio
Filed Oct. 9, 1959, Ser. No. 845,553
7 Claims. (Cl. 189—36)

The invention relates to a freight handling system embodying a lifting device and an article of freight which are interlockable within a socket provided by, e.g., the freight article, by extension thereinto of a complemental portion of the device. The inventon is concerned particularly with anti-creep structure for positively interlocking the device and the article.

The present invention is further closely related to what is termed, in the transportation industry, as "containerization." This term embraces the concept of transporting freight packed in large crane-portable containers from the shipper's dock to the consignee's dock by any type carrier, or by different carriers, without intermediate opening of the containers or any handling of the goods in less-than-container-load quantities. Of recent appearance in the industry is a lifting system applicable to the handling of such containers utilizing a container having a plurality of L-shaped sockets extending inwardly from its top surface, and a lifting implement having a like-plurality of coupling devices spaced in the same horizontal pattern as the sockets of the container. Each coupling device comprises a downwardly extending L-shaped member and a vertically retractable lock of which the latter, when positioned in locking position alongside the L-shaped member, cooperates with the L-member to complementally fit within a corresponding socket of the container. The discovery has been made that under some conditions of loading and operation, a lock may work or creep upward within a socket relative to the L-member to release the corresponding lifting device from its socket. In the loading or unloading of a ship, the possible consequences of such an event are not difficult to contemplate.

Hence, it is the primary object of this invention to provide an automatically coupling freight container and container-lifting system providing positive protection against accidental uncoupling and lock-creeping.

A further object is to provide the freight handling system of the foregoing object with an anti-creep system which automatically becomes inoperative during release of the lifter from the container but automatically becomes operative as the lifter draws up on its load.

Briefly stated, the invention resides in a lifting device adapted for interlocking with an article within an L-shaped opening thereof generally complementary to an entrant portion of the device which embodies anti-creep mechanism.

In its general characteristics, the device comprises a shank extending lengthwise between a supported end and a free end, and a toe extending laterallly from the shank adjacent its free end; a lock supported along the side of the shank opposite to that from which the toe projects for reciprocation along a predetermined ambit lengthwise of the shank; and abutment means, such as a bolt, carried by the lock in reciprocal guide relation therewith along a path forming an acute angle with that portion of the length of the shank disposed between its intersection with the path and its free end.

The abutment means is longer than the dimension of the lock along said path so that the abutment means will project beyond one side of the lock or the other. The shank has a recess in its side facing the lock for receiving the end of the abutment means nearer thereto when the latter is forced along said path toward the shank into flush relation with the outboard side of the lock. In a preferred embodiment, the recess is located with respect to the length of the shank and may be sufficiently elongated to receive the abutment means at any position of the lock within a short terminal portion of its ambit near the free end of the shank in which the lock may interlock the device with the article. At such positions, the abutment means moves endwise into the recess if the device as a whole shifts laterally within the cavity toward the side adjacent the outboard side of the lock.

In the accompanying drawing:

FIG. 1 is a fragmentary elevation in section of a freight lifting system which does not embody the anti-creep improvements of this invention but to which the invention is applicable.

FIG. 2 is a fragmentary elevation illustrating the structure for carrying the lifting device of FIG. 1 and the other figures.

FIG. 3 is a fragmentary elevation in section illustrating the unimproved apparatus of FIG. 1 in a condition permitting uncoupling of the lifting device from the work article shown therein.

FIG. 4 is a fragmentary elevation in section of a freight lifting system embodying anti-creep mechanism in accordance with the invention in an operative condition.

FIG. 5 is a fragmentary elevation in section of the lifting system of FIG. 4 showing the lifting device in interlocked seated relation with the work article and with the anti-creep mechanism inoperative.

FIG. 6 is a fragmentary elevation in section showing the system of FIGS. 4 and 5 with the lock of the lifting device retracted to releasing position and the device out of interlocking relation with the work article.

FIG. 7 is a fragmentary transverse section taken along line VII—VII of FIG. 6.

With attention now to FIGS. 1, 2, and 3, which illustrate the freight handling system generally disclosed herein at a stage of development preceding the present invention, basic parts of a lifting device 10 are a housing 12a and a lock 13a. The device 10 may be supported, for example, within one corner of a four-cornered lifting frame 14 on a pin 15 extending through the upper bearing portion 16a of the housing. The housing has a lower L-member comprising a shank 18a and a toe 19a which, with the lock 13a are adapted to fit generally complementally within a socket or cavity 20 of a liftable work article 21, such as a freight container or other article of freight. In a typical installation, a four-cornered freight-container has one of such cavities at each top corner.

The portion of the device 10 adapted for entering the cavity 20 is generally L-shaped to conform approximately complementally with the L-shape of the cavity. In the normal use of the device 10, it is pendant by its upper bearing portion 16a, as shown, with the cavity-entrant portion disposed downwardly from the point of suspension for the housing.

FIG. 1 shows the device 10 in interlocking relation with the article 21, wherein the lock 13a is in its downward position against an abutment surface 22a extending transversely with respect to the longitudinal direction or axis A—A of the shank 18a and a longitudinally extending surface 23a against which the lock 13a is slidably supported in face-to-face contact. The lock 13a is supported in longitudinally reciprocal relation with the surface 23a by a pair of spaced mutually facing guide surfaces of which surface 24a is shown. These surfaces extend lengthwise of the shank 18a and interiorly of the housing 12a. In addition to seating on the surface 22a at the locking position, the lock may seat on an upwardly facing should 27a of the housing by a lip 26a thereof. When the lock is raised to its releasing position, shown in FIG. 3, the L-member of the housing 10 comprising the shank 18a and the toe 19a are free to shift laterally and upwardly within the cavity 20 out of engagement with a tongue 29 of the article 21, thereby enabling withdrawal of the device from the cavity as illustrated in FIG. 3.

Describing now the present invention with reference to FIGS. 4 to 7, the portions of the lifting device 11 analogous to portions of device 10 are indicated by the same numerals with the "a" dropped. The device 11 comprises a housing 12 and a lock 13 that are modified with respect to their counterparts in FIGS. 1–3. The lock is reciprocable along a path defined by a surface 23 and the guide surfaces 24 and 25 extending lengthwise of the housing 12 with the surfaces 24 and 25 horizontally angularly related with the surface 23. Essential differences are that (1) the lock has a passageway 31 and abutment means, i.e., an anti-creep bolt 32 housed therein, and (2) the housing has a recess 33 along its longitudinal lateral surface 23 and a groove 34 for accommodating the outboard end of the bolt 32 in passage to its released position within the housing 12. As shown, the lengthwise direction of the groove is generally parallel to the lengthwise direction of the surface 23 and the axis A—A.

FIG. 4 depicts the device 11 as exerting a lifting force on the article 21 and in a posture wherein the toe 19 is engaged along the side thereof furthest from the free end of the shank with the underside 28 of the tongue 29 of the article. Further engagement takes place between the outboard side of the lock 13 and the wall surface 35 of the cavity opposite its tongue 29. The surface 35 may be generally parallel to the longitudinal direction of the shank, as shown. To facilitate entrance of the device into the cavity, the free end of the shank is tapered at surfaces 37 and 38. As shown, upper and lower lateral surfaces 19m and 19n of the toe are cut perpendicularly by a plane containing the length of the axis A—A and converge in respect to an outward perpendicular direction from the axis. The housing 12 has surfaces 39 and 41 converging toward the free end of the shank adapting the housing for seating on surfaces 42 and 43 defining a tapering entrance for the cavity 20.

The length of the passageway 31 forms an acute angle $n$ with that portion of the surface 23 which extends from its intersection with the length of the passageway toward the free end of the shank or the length of the shank as measured along axis A—A.

As shown in FIG. 4, the bolt 32 is forced lengthwise toward the shank to dispose its inboard end portion within the recess 33 and its outboard end surfaces 45 in flush relation with the outboard surface of the lock against the cavity wall 35.

As long as a pulling force is acting on device 11 and the article 21 tending to withdraw the device from the cavity 20, the device is wedged against the surfaces 35 and 28 of the cavity because of the inclination of the surface 28. Hence, the anti-creep bolt 32 is trapped between the surface 35 at one end and bottom surface 33c of the recess 33 at the other end. The lateral surface 33d is on the side of the recess farthest from the free end of the shank and is inclined at an acute angle with that part of the surface 23 extending away from its intersection with the surface 33d toward the free end of the free shank end to assure easy withdrawal of the lock. As a result, continued movement of the lock 13 lengthwise of the ambit away from the free end of the shank is blocked. Surface 19n, the lateral surface of the toe furthest from the free end of the shank, is inclined generally complementally to the surface 28 to establish good bearing relation of the toe 19 with the tongue 29 conducive to trouble-free service of the system.

To release the anti-creep mechanism, lifting force between the device 11 and the article 21 is discontinued to allow the device to settle onto the seating surfaces 42 and 43, as shown. The end surface 37 of the shank engages a bottom surface 47 of the cavity; the lateral shank surface 48 is shown engaged with the end surface 49 of the tongue 29. Concurrently with this latter condition, a clearance 51 occurs between the cavity wall surface 35 and the outboard surface of the lock. This clearance permits the bolt 32 to slide in response to gravity downwardly along its passageway 31 out of the recess 33 into the clearance 51 until the inboard end-surface 52 of the bolt is flush with the inboard surface of the lock. This movement is limited by a shoulder 54 of the lock defined by the upper side of the passageway 31 located for engaging an opposing shoulder 55 of the bolt as the bolt end-surface 52 reaches flush relation with the inboard surface of the lock. In the embodiment illustrated, the dimension of the bolt perpendicular to the axis A—A is preferably no greater than the sum of the dimensions of the lock and the recess 33 in the same direction. It is also desirable that such dimension of the bolt be no greater than the sum of the dimensions of the lock and the clearance 51 in such direction to avoid the possibility of engagement of the inboard end of the bolt with any portion of the recess walls in withdrawal of the lock from the cavity 20.

For withdrawal of the device from the cavity 20, after the relative positions thereof have been obtained as illustrated in FIG. 5, the lock 13 is withdrawn along its ambit away from the free end of the shank to a position relative to the shank and the housing, as shown in FIG. 6. Withdrawal of the lock is accomplished by a solenoid or other suitable equivalent. Thereafter, the device may be easily withdrawn as indicated in FIG. 6. It is to be noted that when the lock is withdrawn to its releasing position, as shown in FIG. 6, the bolt 32 rests in its downward position within the lock with shoulders 54 and 55 engaged and an outboard end portion disposed within the groove 32 of the housing. This relationship is shown also in transverse cross-section in FIG. 7.

Coupling of the device 11 and the article 21 may be effected with the lock in its locking position relative to the shank, as shown in FIG. 5. During a coupling operation, the lock readily slides upwardly or endward of the shank away from its free end through engagement of the lower inclined end surface 60 with the gathering surface 42 forming a part of the entrance periphery of the cavity 20. The outboard end surface 61 of the bolt is inclined complementally to the cavity surface 42 to facilitate the entry of the lock and the device as a whole into the cavity 20. Hence, the anti-creep mechanism embodied in the freight handling system illustrated in FIGS. 4 to 7 provides positively locking performance for locked operation and entirely automatic, attention-free operation in coupling and uncoupling operations. It does not impose any additional burdens of operation and maintenance when compared with the use of the unimproved system illustrated in FIGS. 1 to 3.

The terms and expressions which have been employed are used as terms of description and not of limitation and there is no intention of excluding such equivalents of the invention described or of the portions thereof as fall within the purview of the claims.

What is claimed is:

1. A lifting device comprising an L-member comprising a shank extending lengthwise between a supported end and a free end, and a toe extending laterally from the shank adjacent its free end; a lock supported along the side of the shank opposite to that from which the toe projects; said lock and the first named shank side having cooperating guide and abutment surfaces defining a predetermined ambit of reciprocation of the lock extending lengthwise of the shank and said side; abutment means carried by the lock in reciprocal guide relation therewith along a path in fixed relation with the lock and transverse relation to said ambit and forming an acute angle with that portion of said opposite side extending from its intersection with said path toward said free end; said abutment means being longer than the dimension of the lock along said path; said shank having a recess in said opposite side thereof for receiving the end portion of the abutment means nearer thereto; said recess having a surface facing toward said free end and engageable with said end-portion of the abutment means, when said end portion occupies said recess, to limit the movement of the lock along said ambit away from the free end.

2. A lifting device comprising an L-member having a shank extending lengthwise between a supported end and a free end, and a toe extending laterally from the shank adjacent its free end; a lock supported along the side of the shank opposite to that from which the toe projects; said lock and the first named shank side having cooperating guide and abutment surfaces defining a predetermined ambit of reciprocation for the lock extending lengthwise of the shank between spaced locking and releasing positions of the lock of which the releasing position is further from the free end than the locking position; said lock having a passageway extending therethrough from its side facing the shank to its oppositely facing side; the length of the passageway being inclined with respect to the length of the shank in an acute angle with that portion of said opposite side of the shank extending from its intersection toward said free end; an abutment element of greater length than the passageway housed reciprocably therewithin; said shank having a recess in said opposite side for receiving the end of the element nearer thereto; said recess having a surface facing toward said free end and engageable with said end-portion of said element, when said end-portion occupies said recess, to limit the movement of the lock along said ambit away from its locking position.

3. A lifting device comprising an L-member having a shank extending lengthwise between a supported end and a free end, and a toe fixed to the shank adjacent its free end and projecting therefrom transversely with respect to its length; a lock in face-to-face slidable relation with a lateral longitudinal surface of the shank on the side thereof opposite that from which the toe projects; said longitudinal surface being laterally inset with respect to, and defined by, spaced guide surfaces running lengthwise of the shank and in horizontally angled relation with said longitudinal surface, and an abutment surface at the end of said longitudinal surface extending transversely between the guide surfaces; said lock being reciprocable lengthwise of the longitudinal surface between a locking position against said abutment surface to a position further removed from said free end; said lock having a passageway of which its length is inclined with respect to the longitudinal surface and forms an acute angle with the portion thereof extending from its intersection with the passageway length toward said free end; and an anti-creep bolt of greater length than the passageway housed therein for reciprocation lengthwise thereof; said shank having a recess in said longitudinal surface for receiving the near end of the bolt said recess having a surface facing toward said free end and engageable with said end-portion of the bolt, when said end-portion occupies said recess, to limit movement of the lock away from said free end to a position adjacent said abutment surface at positions of the lock at and adjacent to said abutment surface.

4. The device of the claim 3 wherein: the inclination relative to the length of the shank of that surface of the toe farthest from the free end of the shank is reverse to that of the length of said passageway.

5. The device of claim 3 wherein: the lock has a shoulder in said passageway facing toward the shank, and the bolt has an oppositely facing shoulder for engaging the passageway shoulder limiting movement of the bolt away from the shank.

6. The device of claim 3 wherein: the side of said recess farthest from said free end forms an acute angle with that portion of said longitudinal surface extending from the recess toward the free end.

7. In combination; an article to be lifted having an L-shaped cavity extending inwardly from an outside surface thereof and comprising a shank portion and a toe portion; a lifting device adapted to fit complementally within said cavity in interlocking relation with the article; the device comprising: an L-member having a supported end and a free end spaced along its length, and a toe fixed to the shank adjacent its free end and projecting from the shank transversely with respect to its length; the overall transverse dimension of the shank and the toe being no greater than that of said cavity shank portion for passage of the member longitudinally therethrough; a lock; guide means associated with said member for reciprocably supporting the lock along the side of the shank opposite to that from which the toe projects, said guide means defining a reciprocable ambit for the lock lengthwise of the shank between a locking position and a releasing position farther from the free end than the locking position; the lock, at locking position and interlocked relation of the device with the article, being located within the cavity shank portion and, in combination with said shank, substantially filling said shank portion to the extend of preventing complete lateral displacement of the toe from said toe portion; the lock at releasing position being retracted out of said shank portion when any part of said toe occupies said toe portion; the lock having a passageway extending therethrough from an inner surface facing the shank to an opposite outer surface in a direction inclined with respect to said length and away from said supported end; and an anti-creep element of greater length than said passageway supported therein for reciprocation in said inclined direction; said passageway, at interlocked relation of the device and the article, opening at its outboard end within said cavity shank portion; said shank having a recess in registry with the inboard end of said passageway at said interlocked relationship for receiving the end portion of said element when protruding inboardly from the lock; said recess having a surface facing toward said free end of the member for engaging said end portion of the element, when received therein, to limit the movement of the lock out of its locking position.

References Cited in the file of this patent

UNITED STATES PATENTS

| | | |
|---|---|---|
| 201,409 | Graham et al. | Mar. 19, 1878 |
| 718,582 | Rancourt | Jan. 13, 1903 |
| 956,938 | Ciardelli | May 3, 1910 |
| 2,457,842 | Smith et al. | Jan. 4, 1949 |
| 2,464,543 | Modrey | Mar. 15, 1949 |
| 2,465,328 | Modrey | Mar. 22, 1949 |
| 2,547,502 | Smith et al. | Apr. 23, 1951 |
| 2,653,505 | Pietzsch | Sept. 29, 1953 |
| 2,883,930 | Gott et al. | Apr. 28, 1959 |

FOREIGN PATENTS

| | | |
|---|---|---|
| 668,952 | France | Nov. 8, 1929 |

UNITED STATES PATENT OFFICE
CERTIFICATE OF CORRECTION

Patent No. 3,043,411            July 10, 1962

David J. Wyrough

It is hereby certified that error appears in the above numbered patent requiring correction and that the said Letters Patent should read as corrected below.

Column 2, line 68, for "should" read -- shoulder --; column ! lines 59 and 60, strike out "at positions of the lock at and adjacent to said abutment surface"; column 6, line 31, for "extend" read -- extent --.

Signed and sealed this 27th day of November 1962.

(SEAL)
Attest:

ESTON G. JOHNSON
Attesting Officer

DAVID L. LADD
Commissioner of Patents